Jan. 2, 1968  F. L. KLINGLE, SR  3,361,156
FLOAT VALVE ASSEMBLY
Filed Sept. 21, 1965
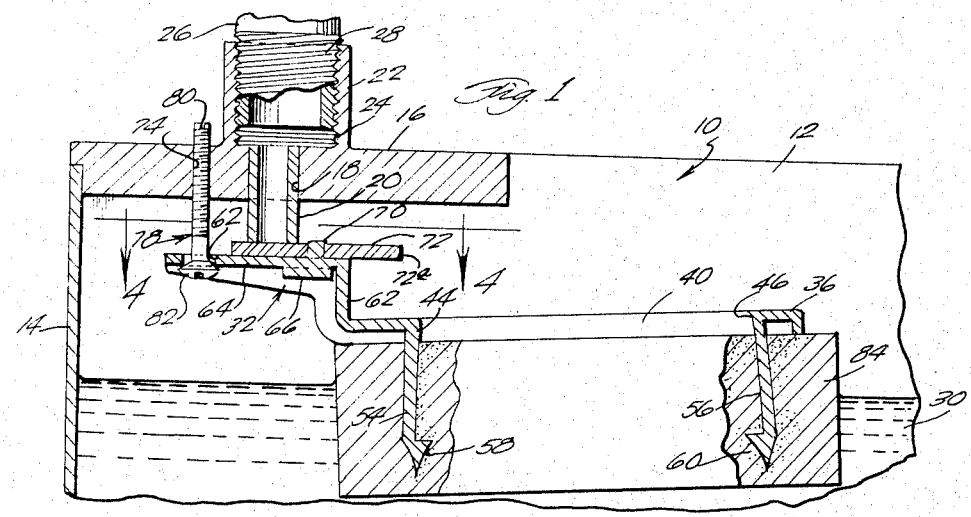
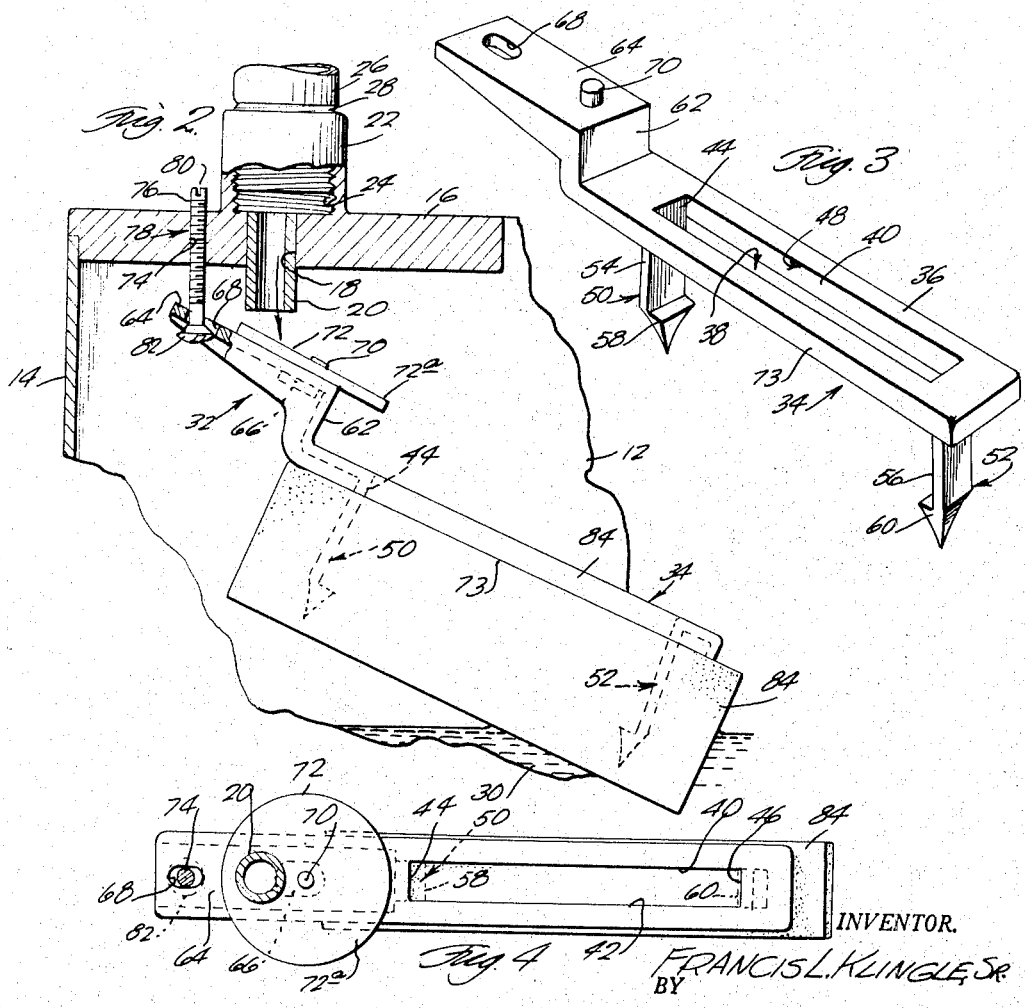
INVENTOR.
FRANCIS L. KLINGLE, SR.
BY
Berman, Davidson & Berman
ATTORNEYS

United States Patent Office

3,361,156
Patented Jan. 2, 1968

3,361,156
FLOAT VALVE ASSEMBLY
Francis L. Klingle, Sr., Cresco, Iowa 52136
Filed Sept. 21, 1965, Ser. No. 488,869
6 Claims. (Cl. 137—448)

This invention relates to the general field of valving art and, more specifically, the instant invention pertains to a float valve.

One of the primary objects of this invention is to provide a float valve assembly as an original installation in a liquid-receiving tank, trough, receptacle, container, or the like, which is adapted to be connected with a liquid-inlet means and wherein the valve assembly becomes operative to close off the liquid-inlet means as the liquid level reaches a predetermined height within the tank, receptacle, or container, and wherein the float valve assembly may be easily substituted for existing valve assemblies functioning on substantially the same principle and without requiring radical revisions in the tank construction to permit the installation of this valving assembly.

Another object of this invention is to provide a float valve assembly for controlling the liquid flow through the discharge end of a pipe or other conduit wherein a simple adjustment of the valving means enables the same to be re-used after wear has rendered a portion thereof ineffective to serve its intended purpose, or use.

A further object of this invention is to provide easily-accessible fulcrum means in the valve assembly in order that the proper valve seating may be obtained through the adjustment of means located externally of the tank.

This invention contemplates, as a still further object thereof, the provision of a floating valve assembly which is noncomplex in construction and assembly, inexpensive to manufacture and maintain, and which is durable in use.

Other and further objects and advantages of the instant invention will become more manifest from a consideration of the following specification when read in conjunction with the annexed drawing, in which:

FIGURE 1 is a longitudinal medial cross-sectional view of a tank or other similar receptacle adapted to receive a liquid flow and in which has been installed the float valve assembly according to this invention, the valve being shown in its closed position;

FIGURE 2 is a cross-sectional view similar to FIGURE 1, FIGURE 2 showing the valve assembly in its open position;

FIGURE 3 is a perspective view of the valve-operating and support lever; and

FIGURE 4 is a top plan view of the valve assembly.

Referring now more specifically to FIGURE 1 of the drawing, reference numeral 10 designates a conventional liquid reservoir, tank or other receptacle having an open upper end. The tank 10 is shown as including a pair of opposed side and end walls 12, 14, respectively, of which only one of each is shown in the drawing. The open upper end of the tank 10 may be wholly or partially closed by a cover plate 16, as desired, suitably-supported on side and/or end walls 12, 14, all in the conventional manner.

As is seen in FIGURES 1 and 2, the cover plate 16 is provided with a transversely-extending upright bore 18 that receives therein one end of a hollow tubular conduit 20 which, at its outer end, terminates flush with the plane of the upper side of the cover plate 16. The other end of the conduit 20 extends downwardly into the tank 10 below the plane of the underside of the cover plate 16 and into the tank 10. Integral with the cover plate 16 is a substantially hollow upright cylindrical boss 22 internally-threaded as at 24. As is seen in FIGURES 1 and 2, the lower end of the boss 22 circumscribes the upper end of the conduit 20 with the longitudinal axes thereof being parallel, but offset with respect to one another. Reference numeral 26 designates the discharge end of a liquid supply pipe externally-threaded at 28 and being adapted for threaded connection with the threads 24 whereby the pipe 26 may be detachably-connected with the boss 22 to supply a liquid 30 to the conduit 20 and thence into the tank 10.

The float-and-valve assembly to which this invention pertains is generally designated by reference numeral 32 and is seen to include an elongated substantially rectangular lever 34 having a main body portion 36. The main body portion 36 is axially-slotted, as at 38, the slot being defined by the pair of oppositely-disposed longitudinally-extending substantially parallel sidewalls 40, 42, and the pair of oppositely-disposed substantially parallel end walls 44, 46. The side and end walls 40, 42 and 44, 46 have portions thereof depending below the underside of the main body portion 36 defining an open hollow elongated peripheral flange 48. To serve a function to be described infra, the end walls 44, 46 are integrally-connected to the upper ends of a pair of L-shaped hooks 50, 52 each of which includes a depending leg 54, 56, respectively, having laterally-offset confronting inverted pyramidal feet 58, 60. As is seen in FIGURES 1 and 2, the legs 54, 56 diverge downwardly away from one another with the angle of divergence of the leg 54 relative to the main body portion 36 being less acute than that of the leg 56.

The inner end of the main body portion 36 is integrally-connected with the lower end of an upright substantially rectangular riser 62 which, at its upper end, continues in an elongated substantially rectangular platform 64 extending in a direction away from the main body portion 36 in vertically-spaced and substantially parallel relationship relative thereto. The underside of the platform 64 adjacent the riser 62 is integral with a depending reinforcing longitudinally-extending rib 66. The other or outer end of the platform 64 is provided with a centrally-located longitudinally-extending slot 68. A substantially cylindrical stub shaft 70 projects upwardly from the platform 64 adjacent the inner end thereof and telescopically receives thereover a centrally-apertured portion of a substantially cylindrical or discoidal valve element 72 formed of any suitable material. As is seen in the drawing, the valve element 72 is provided with a portion 72a which overhangs the inner end of the main body portion 36 in vertically-spaced relation relative thereto. As is seen in FIGURES 1, 2 and 3, a continuous skirt 73 extends downwardly from the opposed sides of the platform 64, the riser 60 and the main body portion 36, and the lower end thereof is substantially coplanar with the lower end of the flange 48.

At 74 is indicated a vertically-extending internally-tapped bore which extends transversely through the cover plate 16 with its longitudinal axis parallel to, but spaced from the longitudinal axes of the conduit 20 and the boss 22 and, as is seen in FIGURES 1 and 2, the bore 74 is located proximate to, but externally-spaced from the outer side of the boss 22. The bore 74 is adapted to adjustably receive therein the threaded shank 76 of an elongated screw 78, the shank 76 extending transversely through the cover plate 16 with its opposed ends projecting beyond the opposite sides thereof. The upper exposed end of the shank 76 is slotted, as at 80, to receive the blade of a screwdriver or other adjusting tool, not shown, the tool being conventional in the art. The lower normally concealed end of the shank 76 extends loosely through the slot 68 and terminates in an enlarged head 82 which serves as an abutment to prevent inadvertent disconnection between the screw 78 and the float valve assembly 32. As will become more evident below, the screw 78 serves as a fulcrum about which the float valve assembly 32 pivots in moving from its closed position to its open position, and vice versa.

Reference numeral 84 denotes an elongated substantially rectangular block of ethafoam or other suitable similar buoyant material. The block 84 is jammed over the L-shaped hooks 50, 52 and is fixedly-secured thereon without the use of nuts, bolts and other commonly-used connecting means.

From the above description, when taken together with FIGURES 1 and 2 of the drawing, the operation of the float-valve assembly 32 is deemed to be self-evident. However, a brief summary thereof is presented infra.

FIGURE 1 shows the float-valve assembly 32 in its closed position in a tank 10 having a liquid 30 disposed therein, the level of the liquid being that to be controlled by the float-valve assembly 32. The tank 10 is connected via the conduit 30, boss 22 and pipe 26 with a liquid source, not shown. When the liquid 30 is dispensed from the tank 10, the level thereof falls and the block 84, in following the liquid level, pivots about the screw 78 and draws the lever 34 downwardly, causing the discoidal or cylindrical valve element 72 to also pivot downwardly, thereby to become unseated from its former seated position shown in FIGURE 1, to its fully open position shown in FIGURE 2. As the valve element 72 moves to its open position, liquid is discharged through the conduit 20 to refill the tank 10, and as the block 84 follows the liquid level upwardly, the valve element 72 again seats against the lower end of the conduit 20, thereby closing off the further supply of the liquid to the tank 10.

As the discoidal valve element 72 wears, the operator may vertically adjust the screw 78 to compensate for the same or, if desired, he may merely rotate the valve element 72 and rotate the same about the stub shaft 70 to present a new surface to the exposed lower end of the conduit 20. This is accomplished by grasping the exposed overhanging lip portion 72a and turning the valve element 72 about the stub shaft 70. If desired, the valve element 72 could be removed from the shaft 70 and reversed to present an unworn surface to the underside of the conduit 20. The variable adjustment or screw 78 provides the user with a wide latitude in replacing the valve element 72 either for wear or after a replacement has been made therefor, for the adjustment screw 78 makes possible the use of valve elements having various thicknesses. The replacement or circular adjustment of the valve element 72 may be accomplished with facility since the stub shaft 70 is always exposed, and the adjustment of the fulcrum screw is easily made since it is externally-located of the tank 10 above the cover plate 16.

Having described and illustrated one embodiment of this invention in detail, it will be understood that the same is offered merely by way of example, and that this invention is to be limited only by the scope of the appended cliams.

What is claimed is:
1. A float valve assembly for controlling the level of a liquid in a tank having sidewalls and an open upper end, a closure plate supported on said walls and extending across said open upper end of said tank, a conduit extending transversely through said closure plate and having one end opening above said closure plate and a lower discharge end depending below said closure plate into said tank, a hollow boss fixedly secured to said closure plate and projecting upwardly therefrom, said boss circumscribing said one end of said conduit and affording means for connecting said tank with a source of liquid supply, an elongated member having a pair of opposed ends, said member extending through said closure plate and having an end terminating above said closure plate and its other end extending below said closure plate into said tank, means for axially-adjusting said member transversely through said plate, said float valve assembly including an elongated substantially rectangular lever having a pair of opposed ends, said lever having an elongated substantially rectangular main body portion, a riser fixedly-connected to one end of said main body portion and projecting upwardly therefrom, an elongated substantially rectangular platform having one of its ends fixedly-connected to said riser with its other end projecting longitudinally away from said main body portion in vertically-spaced and parallel relation relative thereto, means pivotally-connecting the other end of said platform to said member to support said main body portion and the other end of said platform for vertical movement toward and away from said discharge end of said conduit, a discoidal valve element rotatably-supported on said platform adjacent said one end thereof and normally seating across said discharge end of said conduit to cut off the liquid supply to said tank when said liquid level in said tank reaches a predetermined liquid level therein and being movable away from said discharge end of said conduit when said liquid level falls from its predetermined high, a block of buoyant material disposed within said tank, and means fixedly connecting said block to said main body portion whereby said main body portion and said platform pivot toward and away from said discharge end of said conduit as said block rises and falls with said liquid level.

2. A float valve assembly as defined in claim 1, wherein said member comprises an elongated screw having a shank threaded through said closure plate and having a bifurcated end to receive an adjustment tool at its upper end and an enlarged head at the lower end thereof, said shank extending loosely through said other end of said platform with said head engaging therebelow.

3. A float valve assembly as defined in claim 2, wherein said shank extends loosely through an elongated longitudinally-extending slot extending transversely through said platform adjacent said one end thereof, a stub shaft projecting upwardly from said platform adjacent its said other end, and said discoidal valve element having the central portion thereof telescoped over said shaft to rotatably-support said valve element thereon, said valve element having a portion overhanging said main body portion to provide means to manually-rotate said element on said shaft.

4. A float assembly as defined in claim 3, wherein said shaft is externally-positioned relative to said discharge end of said conduit.

5. A float assembly as defined in claim 4, wherein said main body portion is provided with a longitudinally-extending substantially rectangular transverse slot and a J-shaped hook for each end of said slot, said hooks each comprising a leg having a pair of opposed ends with one end of each leg fixedly-secured to said main body portion and the other end thereof depending from said main body portion and terminating in an inverted pyramidal foot, said hooks being inserted through said block to fixedly-secure said block to said main body portion.

6. An article of manufacture comprising an elongated lever for a float valve assembly, said lever comprising an elongated substantially rectangular main body portion having a pair of opposed ends and having a longitudinally-extending slot formed therein disposed intermediate said ends, said main body portion having a pair of longitudinally-spaced J-shaped hooks projecting laterally from one side thereof and disposed in confronting relation relative to one another, a substantially rectangular riser having a pair of opposed ends with one of its said ends fixedly-secured to said one end of said main body portion and projecting laterally away from the other side thereof, an elongated substantially rectangular platform having an end fixedly-secured to the other end of said riser, the other end of said platform extending away from said main body portion in vertically-spaced relation relative thereto, and the other end of said platform having a longitudinally-extending transverse slot formed therein.

References Cited

UNITED STATES PATENTS

| | | | |
|---|---|---|---|
| 3,004,748 | 10/1961 | Sprouse et al. | 137—448 X |
| 3,138,140 | 6/1964 | Byrd | 137—426 X |
| 3,153,422 | 10/1964 | Marsee et al. | 137—434 |
| 3,176,707 | 4/1965 | Wilson | 137—448 X |

WILLIAM F. O'DEA, *Primary Examiner.*

D. R. MATTHEWS, *Assistant Examiner.*